United States Patent
Gao

(10) Patent No.: US 10,556,603 B2
(45) Date of Patent: Feb. 11, 2020

(54) COLLISION ENERGY ABSORPTION APPARATUS FOR RAIL VEHICLES

(71) Applicant: CENTRAL SOUTH UNIVERSITY, Changsha (CN)

(72) Inventor: Guangjun Gao, Changsha (CN)

(73) Assignee: CENTRAL SOUTH UNIVERSITY, Changsha, Hunan (CN)

( * ) Notice: Subject to any disclaimer, the term of this patent is extended or adjusted under 35 U.S.C. 154(b) by 0 days.

(21) Appl. No.: 16/081,066

(22) PCT Filed: Sep. 30, 2016

(86) PCT No.: PCT/CN2016/101078
§ 371 (c)(1),
(2) Date: Aug. 30, 2018

(87) PCT Pub. No.: WO2017/148145
PCT Pub. Date: Sep. 8, 2017

(65) Prior Publication Data
US 2019/0092355 A1    Mar. 28, 2019

(30) Foreign Application Priority Data
Mar. 1, 2016  (CN) .......................... 2016 1 0115228

(51) Int. Cl.
*B61F 19/04* (2006.01)
*B61G 11/18* (2006.01)
(Continued)

(52) U.S. Cl.
CPC .............. *B61F 19/04* (2013.01); *B61G 11/18* (2013.01); *B64C 25/62* (2013.01); *F16F 7/127* (2013.01)

(58) Field of Classification Search
CPC ........... B61F 19/04; B61G 11/18; F16F 7/127
(Continued)

(56) References Cited

U.S. PATENT DOCUMENTS 2,961,204 A * 11/1960 Rayfield ................. F16F 7/127
 244/138 R
3,143,321 A   8/1964 McGehee
(Continued)

FOREIGN PATENT DOCUMENTS

CN    101289089 A    10/2008
CN    102180182 A    9/2011
(Continued)

OTHER PUBLICATIONS

International Search Report in international application No. PCT/CN2016/101078, dated Jan. 11, 2017.
(Continued)

*Primary Examiner* — Hilary L Gutman
(74) *Attorney, Agent, or Firm* — Syncoda LLC; Feng Ma

(57) ABSTRACT

A collision energy absorption apparatus for a rail vehicle, including a connection member, a base, and an energy-absorption splitting tube provided on the outer side in the radial direction of the connection member. The inner wall and outer wall of the energy-absorption splitting tube includes one or more pairs of slits having radial positions corresponding to each other. Each pair of slits includes an inner slit and an outer slit. Each slit is a non-closed linear slit. The slit has a width of 0.05-0.8 mm. The sum of the depths of each pair of slits is less than the wall thickness of the energy-absorption splitting tube.

19 Claims, 3 Drawing Sheets

(51) Int. Cl.
B64C 25/62 (2006.01)
F16F 7/12 (2006.01)

(58) Field of Classification Search
USPC .......................................................... 293/133
See application file for complete search history.

(56) References Cited

U.S. PATENT DOCUMENTS

| | | | | |
|---|---|---|---|---|
| 3,236,333 | A * | 2/1966 | Mitchell | F16F 7/127 |
| | | | | 188/374 |
| 3,298,465 | A * | 1/1967 | Stastny | F16F 7/123 |
| | | | | 188/377 |
| 3,608,677 | A | 9/1971 | Wykes | |
| 3,635,314 | A * | 1/1972 | Mazelsky | B62D 1/192 |
| | | | | 188/372 |
| 5,074,391 | A * | 12/1991 | Rosenzweig | B60N 2/4221 |
| | | | | 188/374 |
| 6,308,809 | B1 * | 10/2001 | Reid | F16F 7/125 |
| | | | | 188/377 |
| 8,584,819 | B2 * | 11/2013 | Bettinger | F16F 7/125 |
| | | | | 188/372 |

FOREIGN PATENT DOCUMENTS

| | | | |
|---|---|---|---|
| CN | 102398558 | A | 4/2012 |
| CN | 103148144 | A | 6/2013 |
| CN | 103507823 | A | 1/2014 |
| CN | 104088947 | A | 10/2014 |
| CN | 104494629 | A | 4/2015 |
| CN | 105292164 | A | 2/2016 |
| CN | 105644579 | A | 6/2016 |
| CN | 205396114 | U | 7/2016 |
| DE | 9623449 | A1 | 1/1998 |
| DE | 19627061 | C2 | 1/1998 |
| DE | 10140503 | A1 | 3/2003 |
| KR | 20100125540 | A | 12/2010 |
| NL | 7003416 | A * | 9/1970 ............. B61G 11/18 |

OTHER PUBLICATIONS

English Translation of the Written Opinion of the International Search Authority in International application No. PCT/CN2016/101078, dated Jan. 11, 2017.

* cited by examiner

COLLISION ENERGY ABSORPTION APPARATUS FOR RAIL VEHICLES

TECHNICAL FIELD

The present disclosure relates to the field of collision energy absorption apparatus, and in particular to a collision energy absorption apparatus for a rail vehicle.

BACKGROUND

Recently, with the rapid development of rail transit, safety issues of rail transit vehicles during operation have received increasing attention. Meanwhile, the operation of rail transit is an large system in which electrical service, maintenance, vehicles, signals, embarkation service and the like are integrated. In this case, occasional human errors or mechanical failures are inevitable. Thus, train collision accidents occur over time, and result in tremendous casualties and property losses. The most effective method for reducing the impact of a collision accident is improving the crashworthiness of a vehicle.

Currently, when designing the crashworthiness of a rail vehicle, unmanned areas at both ends of the vehicle are generally designed with weak stiffness and manned areas are designed with strong stiffness, so that the unmanned areas undergo a large plastic deformation during an collision accident of the vehicle to dissipate the collision energy, while the manned areas merely undergo an elastic deformation or small plastic deformation, thereby ensuring the space integrity of the manned areas.

There are two type of structure of the unmanned area for dissipating energy: a load-bearing energy absorbing structure and a dedicated energy absorption structure. In addition to the function of absorbing collision energy during a vehicle collision accident, the load-bearing energy absorption structure also bears loads in normal applications. The characteristics of this structure at least lie in that it provides a low cost and a simple construction, but needs cumbersome repairs and a high repair cost after collision. The dedicated energy absorption structure is mounted on either ends of a vehicle and bears no load in normal applications. These structures dissipate collision energy through plastic deformation thereof only when collision accident of the vehicle occurs. The dedicated energy absorption structure is widely used in the crashworthiness design of modern rail vehicles due to its stable deformation, convenient replacement, and low repair cost, etc.

Dedicated collision energy absorption structures can be known from the following related art documents.

Patent application CN 102398558 relates to a collision buffering energy absorption device, a base plate of the collision buffering energy absorption device is connected to a guide boss, and keep a certain distance away from a friction guide plate; an energy absorption tube with an axial groove surrounds around the guide boss; and a substrate is mounted at the other end of the energy absorption tube. The groove may be machined in the outer surface of the energy absorption tube or in the inner surface of the energy absorption tube, and the energy absorption tube may be partially torn at the groove or not torn during assembling. When the substrate is pressed, the substrate drives the energy absorption tube to move toward the base plate, during the moving, a portion of energy is absorbed through the friction between the energy absorption tube and the guide boss; meanwhile, due to the cross-sectional area of the guide boss becomes larger as the guide boss approaches the base plate, the energy absorption tube is torn at the axial groove at a certain moment, and a portion of the energy is absorbed during tearing; then the torn part of the energy absorption tube is bent to enter a space between the friction guide plate and the base plate, and during the advancing stroke of the torn part, a portion of the energy is absorbed through friction; and eventually the buffering energy absorption effect is achieved. This collision buffering energy absorption device is simple in structure, easy to manufacture, and low in cost. Meanwhile, this collision buffering energy absorption device may absorb energy load uniformly, has high capacity, and can serve as good passive safety protection equipment.

Additionally, patent CN 103148144 also disclosed a novel energy absorption device buffering uniformly. The energy absorption device comprises a round pre-torn tube, a guide friction round tube and a punch. The round pre-torn tube is a thin-walled metal round tube, and one end of the tube is circular truncated cone in shape and is in the form of a funnel, this end is provided with a cone angle; the other end of the tube, with the guide friction round tube, are fixed on a same panel by adhesive or brazing and are kept coaxial relative to each other. The guide friction round tube is slightly longer than the round pre-torn tube in length, in order for the energy absorption device partially cooperates with the punch before the energy absorption device is impacted. A tearing slot is provided in the wall of the round pre-torn tube and a tearing opening is provided in an end of the round pre-torn tube. The head of the punch is in the form of a circular truncated cone, and the transition between the head and the end of the round pre-torn tube closed to the punch is steady and smooth. A through hole interference fitted with the outer wall of the guide friction round tube is provided in the punch and plays a role of axial positioning and absorbing a portion of energy through friction. This device absorbs energy mainly by the bulging resulting from the extruding of the punch into the round pre-torn tube and the following tear of the round tube. Specifically, the round pre-torn tube has an inner diameter between 30 and 80 mm, a wall thickness h1 between 2 and 5 mm, and a length L1 between 60 and 120 mm. Compared with the conventional energy absorption modes, the tear and curling damage of the round tube is more effective in energy absorption effect than breaking, axial flection or turnover, and the device has the characteristics of long effective stroke and smooth impact force.

However, due to the dedicated energy absorption structures disclosed in the above documents, only an crushing energy absorption manner of a thin-walled structure can be employed, and there may be a significant impact force peek in the structure of this type at the time of initial crushing, which would increase the damage to subsequent structures, and cause significant inconvenience to the crashworthiness design of the structure. Furthermore, the maximum effective stroke of the crushing energy absorption manner of the thin-walled structure is generally less than 70%, and thus this structure cannot fully utilize the effective stroke of the energy absorption device.

SUMMARY

In view of the drawbacks "high initial impact force peek" and "low effective stroke" of the existing energy absorption devices of rail vehicles, the present disclosure provides a novel collision energy absorption apparatus for rail vehicle. This collision energy absorption apparatus is able to significantly reduce the initial impact force peak of the apparatus and the effective stroke can theoretically reach 100%. This apparatus may be conveniently mounted at the end of the rail vehicle, and may act the role of dissipating collision kinetic energy during the collision of the vehicle. In addition, in the related art, the inner wall and outer wall of a round pre-torn tube are provided with grooves with a certain width. However, the inventors of the present application have found, by testing, that such solutions make it difficult to achieve an ordinal tearing of the round pre-torn tube after collision occurs. Accordingly, there is a need in the art for an energy absorption apparatus with a more stable tearing.

The present disclosure provides a collision energy absorption apparatus for a rail vehicle, including a connector, a base, and an energy absorption tearing tube radially disposed on the outer side of the connector. The inner and outer walls of the energy absorption tearing tube may be provided with 2 to 20 pairs of kerfs. Each pair of kerfs includes an inner kerf and an outer kerf which have radial positions corresponding to one another on the energy absorption tearing tube. Each kerf may be a non-closed linear kerf and the width of which is between 0.05 and 0.8 mm, and the sum of the depths of each pair of kerfs may be less than the wall thickness of the energy absorption tearing tube. The base may include semicircle structures, such that torn strips of the energy absorption tearing tube formed after the collision can curl in a predetermined direction under the restriction of these structures.

In a specific embodiment, a length direction of the kerfs coincides with that of the energy absorption tearing tube, and the width of the kerfs may be between 0.08 and 0.5 mm. In a specific embodiment, the width of the kerfs may be between 0.1 and 0.3 mm and the pairs of kerfs may be uniformly distributed in a circumferential direction of the energy absorption tearing tube.

In a specific embodiment, the energy absorption tearing tube may be a metallic tube.

In a specific embodiment, one end of each of the connector and the energy absorption tearing tube is fixedly connected to a collision fender in a length direction, while the other end of each of the connector and the energy absorption tearing tube is connected to the base which includes an inner bore in the base, and the connector passes through the inner bore in the base.

In a specific embodiment, the base includes the semicircle structures, such that torn strips of the collision absorption tearing tube formed after the collision can curl in a predetermined direction under the restriction of these structures. After being torn into strips, the energy absorption tearing tube curls outwards the circumference of the energy absorption tearing tube under the guiding of the semicircle structures, thereby resulting in a further increased energy consumption of the system and a reduced space occupied by the energy absorption apparatus.

In a specific embodiment, the energy absorption tearing tube has a diameter between 50 and 400 mm, preferably between 100 and 200 mm. The diameter of the semicircle structures is between 30 and 350 mm, and the diameter of the semicircle structures is 20 to 50 mm less than that of the energy absorption tearing tube. In the present disclosure, the torn strips may have a most suitable curling radius and in an optimal curling state after tearing by defining the diameter of the semicircle structures 31 in a nominal range.

In a specific embodiment, the connector 2 is a hollow guide tube, one axial end of which is connected to the collision fender and the other axial end of which is connected to the base. The movement of the guide tube in the inner bore in the base 3 may guide the energy absorption tearing tube after the collision occurs. The base and the guide tube are connected by shear bolts in such a way that the guide tube is able to move axially in the inner bore in the base due to the breakage of shear bolts after the collision. In another specific embodiment, the connector 2 does not serve as a guide. The connector 2 is a rigid rod or a flexible member, such as an iron wire, and an inner guide is achieved by a segment of the base 3 axially inserted into the energy absorption tearing tube, as shown in FIG. 2. The length of the segment is $\frac{1}{5}$ to $\frac{2}{3}$, preferably $\frac{1}{3}$ to $\frac{1}{2}$ of the length of the tearing tube. Alternatively, the energy absorption tearing tube is guided by outer guides 5 as shown in FIG. 5, the outer guides 5 are fixedly mounted to the vehicle body during assembly. In the present disclosure, preferably, the connector 2 is a flexible member that is bent or crimped within the tearing tube after collision occurs, such that the space occupied by the overall energy absorption apparatus can be reduced.

In a specific embodiment, an end of the energy absorption tearing tube closed to the base is provided with tearing openings which extend through the wall thickness of the energy absorption tearing tube. The number of the tearing openings is coincident with that of the pairs of the kerfs, and the tearing openings are in axially communication with the kerfs. By means of the provided tearing openings in the present disclosure, a stable tearing of the expanded energy absorption tearing tube starting from the locations of the tearing openings can be produced.

In a specific embodiment, the tearing openings and the kerfs together form a structure crossing through both ends of the energy absorption tearing tube in the axial direction.

In a specific embodiment, the wall thickness of the energy absorption tearing tube 1 may be between 1 and 50 mm, but preferably between 4 and 20 mm, and more preferably between 6 and 20 mm. In the present disclosure, after the energy absorption tearing tube being torn due to the collision, the torn strips regularly curl under the guided curling effects of the semicircle structures 31. The curling radian of the torn strips depends on the diameter of the semicircle structures 31, and also on the diameter and the wall thickness of the energy absorption tearing tube, and further on the number of the torn strips after tearing, i.e. the number of the tearing openings 12 or of the kerfs 11.

In a specific embodiment, each of the inner and outer kerfs may have a depth of $\frac{1}{10}$ to $\frac{2}{5}$ of the wall thickness of the energy absorption tearing tube.

The present disclosure has at least the following advantages:

1) A more stable and reliable deformation will be produced during the tearing of the energy absorption tearing tube 1, due to the inner and outer surfaces of the energy absorption tearing tube 1 are provided with paired kerfs with a very fine width.

2) According to the present disclosure, kerfs with a specific structure are disposed on the inner and outer walls of the energy absorption tearing tube 1, so that an energy absorption tearing tube of greater wall thickness can be adopted in the present disclosure. Thus the collision energy absorption apparatus according to the present disclosure can provide a better energy absorption effect in a limited space. On the other hand, for a same collision energy absorption effect, the energy absorption tearing tube 1 in the apparatus according to the present disclosure may be shorter, thus less space is occupied by the collision energy absorption apparatus.

3) According to the present disclosure, the base 3 is provided with specific semicircle structures 31, and the semicircle structures 31 are disposed at an axial end of the energy absorption tearing tube 1, so that the torn strips formed after the collision will curl regularly along these structures under the restriction of the semicircle structures of the base. Specifically, the torn strips formed after the tearing of the energy absorption tearing tube 1 curl at the axial end of the energy absorption tearing tube towards the circumference direction thereof. This development allows a less space occupied by the overall collision energy absorption apparatus and an increased energy absorbed by the apparatus.

4) According to the present disclosure, the cooperation between the energy absorption tearing tube 1 and the base 3 over a certain length plays a role of elementarily guiding, and the energy absorption tearing tube 1 may be further guided through the sliding of the guide tube in the inner bore in the base after the break of the shear bolts. Such dual guide facilitates the tearing deformation of the energy absorption tearing tube 1 and improves the guide capability of the apparatus.

Figure 1:
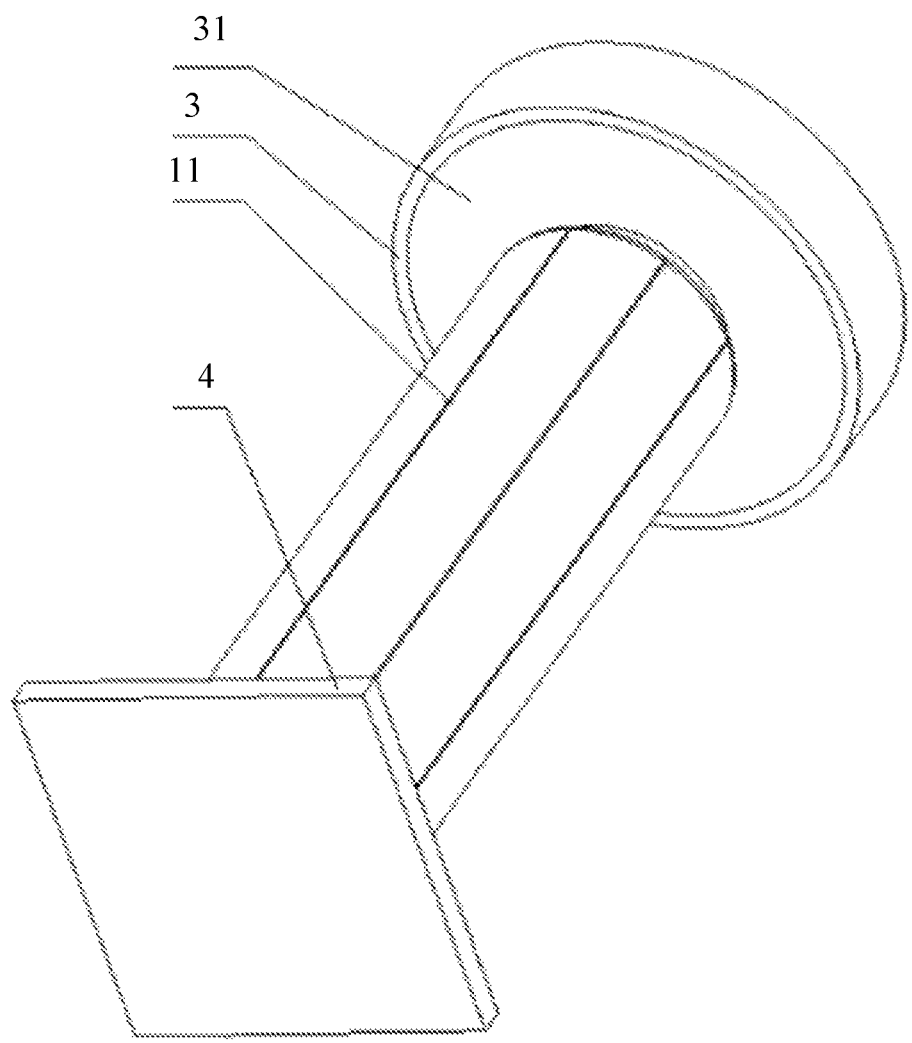
FIG. 1 is an overall view of the structure of the collision energy absorption apparatus according to the present disclosure.

Reference symbols in the drawings: 1—energy absorption tearing tube; 2—connector; 3—base; 4—collision fender; 5—outer guide; 11—kerf; 111—inner kerf; 112—outer kerf; 12—tearing opening; 31—semicircle structure; 32—inner bore in the base.

DETAILED DESCRIPTION

Figure 2:
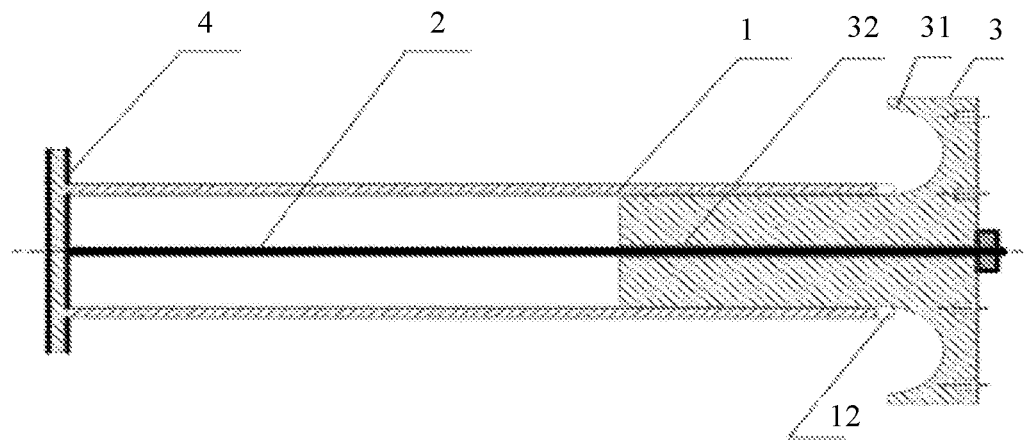
FIG. 2 is a sectional view of the structure of the collision energy absorption apparatus of FIG. 1 according to the present disclosure.
Figure 3:
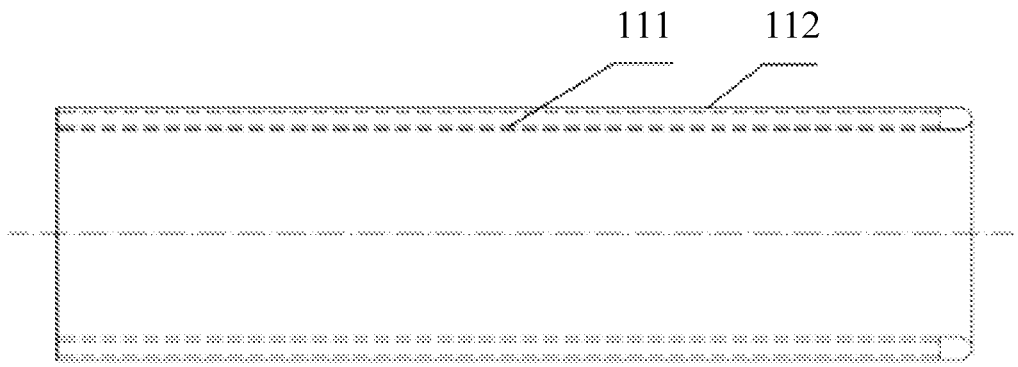
FIG. 3 is an axial schematic view of the energy absorption tearing tube of the present disclosure.
Figure 4:
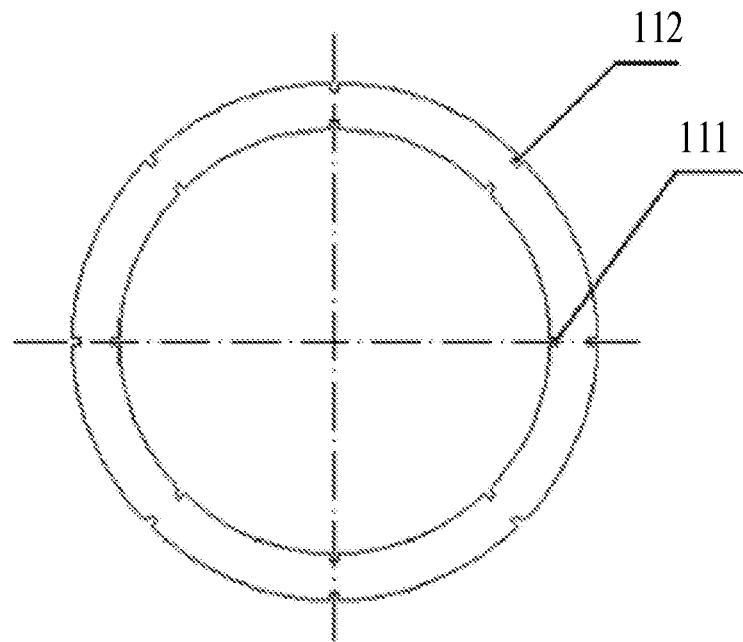
FIG. 4 is a radial schematic view of the energy absorption tearing tube of the present disclosure.
Figure 5:
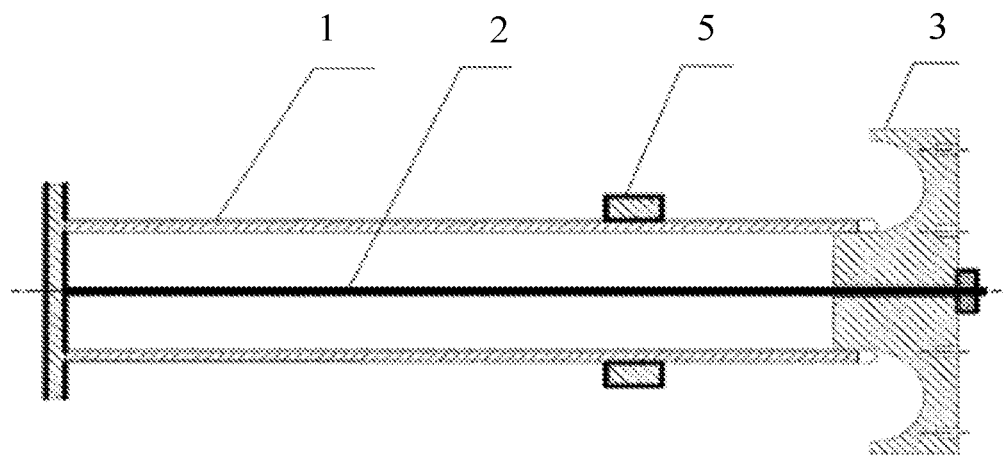
FIG. 5 is a sectional structural view of another collision energy absorption apparatus according to the present disclosure.

FIGS. 1-4 show a collision energy absorption apparatus for a rail vehicle provided by the present disclosure, including a connector 2, a base 3, and an energy absorption tearing tube 1 radially disposed on the outside of the outer side of the connector. The connector 2 is a flexible connector such as an iron wire. The inner and outer walls of the energy absorption tearing tube are provided with eight pairs of kerfs which have radial positions corresponding to one another. Each pair of kerfs comprises an inner kerf and an outer kerf. Each kerf is a non-closed linear kerf. The width of each kerf is between 0.1 and 0.25 mm and the depth of each kerf is ⅕ of the wall thickness of the energy absorption round tube, and thus the sum of the depths of each pair of kerfs is ⅖ of the wall thickness of the energy absorption tearing tube. One end of each of the connector and the energy absorption tearing tube is fixedly connected to a collision fender in a length direction, and the other end is connected to the base which includes an inner bore in the base. The connector passes through the inner bore in the base. The base includes semicircle structures with a semi-circular cross-section, such that torn strips of the collision absorption tearing tube formed after the collision can curl in a predetermined direction under the restriction of these structures, thereby resulting in a further increased energy consumption of the system and a reduced space occupied by the energy absorption apparatus. In the drawings, a diameter of the energy absorption tearing tube is 150 mm and a diameter of the semicircle structure is 125 mm. An end of the energy absorption tearing tube closed to the base is provided with eight tearing openings passing through the energy absorption tearing tube in a wall thickness direction. The respective one of the tearing openings are in axially communication with each pair of kerfs, and the tearing openings and the kerfs together form a structure crossing through both ends of the energy absorption tearing tube in the axial direction. The wall thickness of the energy absorption tearing tube 1 in the drawings is 10 mm.

In the present disclosure, the "non-closed linear kerfs" means that the head and the tail of each kerf are not in communication with each other, e.g. each kerf is not an annular closed kerf. The lines of the kerfs may be in a variety of forms such as a straight line, a curved line, or a fold line and the like. When the energy absorption tearing tube is a cylindrical tube, the kerfs for example may be in a form of straight lines parallel to an axis of the energy absorption tearing tube; when the energy absorption tearing tube is a circular truncated cone tube, the kerfs for example may also be in a form of straight lines following the outer wall of the circular truncated cone. Further, when the energy absorption tearing tube is a tube with a curved outer surface, the kerfs further may be configured to be in a form of curved lines. In a specific embodiment, each kerf is a kerf extending in the length direction of the energy absorption tearing tube 1. In the present disclosure, the kerfs with a certain depth may be formed in the energy absorption tearing tube 1 by wire cutting, such as wire cut electrical discharge machining.

Since the width of the grooves in the related art is significantly greater than that of the kerfs in the present disclosure, the inventors of the present disclosure found that all of the round pre-torn tubes of the devices in the above related art are expanded at first and then torn. During the expansion, the plastic deformation of the round pre-torn tubes are concentrated at the grooves, rather than being uniformly distributed in a circumferential direction of the round pre-torn tube, so that the effect of energy absorption of such devices is limited after the collision. The energy absorption tearing tube according to the present disclosure is torn directly in accordance with the guide of the kerfs and without the expansion. Because the width of the kerfs in the present disclosure is small, the precision of the width and depth of the kerfs can be high, for instance, a precision up to the order of 0.001 mm. The presence of the kerfs will not affect the structure of the energy absorption tearing tube before the tearing, thus the thickness of the energy absorption tearing tube according to the present disclosure can be configured to be significantly greater than that of the round pre-torn tube in the related art.

According to the present disclosure, the outer wall and inner wall of the energy absorption tearing tube are provided with kerfs having a small width, such that the energy absorption tearing tube can be accurately axially torn during the tearing. The kerfs do not come into contact with the base during the tearing, such that a more stable tearing can be obtained.

In the present disclosure, when the connector is a guide tube, the guide tube is connected with the base by shear bolts, the shear bolts plays a role in indirectly reinforcing the connection between the energy absorption tearing tube 1 and the base 3 during normal operation of the vehicle. In the event of a collision of the vehicle, the shear bolts are sheared off, and the guide tube slides in the inner bore in the base 32, to guide the energy absorption tearing tube 1. In a specific embodiment, the collision energy absorption apparatus are collision energy absorption apparatus for a rail vehicle, the collision fenders 4 are disposed on the front and rear ends of the rail vehicle in a length direction of the rail vehicle, and the bases 3 are fixedly connected to the rail vehicle body.

In a specific embodiment of the disclosure, the base 3 plays a role of elementarily guiding or fully guiding. When the base 3 only plays a role of elementarily guiding, the length of the part of the energy absorption tearing tube 1 and the base 3 for assembly is 2 to 30%, preferably 5 to 20% of the length of the energy absorption tearing tube 1. When the assembly between the energy absorption tearing tube 1 and the base 3 plays a role of elementarily guiding, the tearing of the energy absorption tearing tube 1 is more stable under the fine guidance of the guide tube 2 or the outer guide 5. In the present disclosure, the break limit of the shear bolt is much less than the tear limit of the energy absorption tearing tube 1, thus the shear bolt is broken before the tear of the energy absorption tearing tube 1.

The above are only the preferable embodiments of the present disclosure and are not intended to limit the present disclosure. It is apparent for those skilled in the art that modifications or variations to the present disclosure are possible. And any modification, equivalent replacement or improvement within the spirit and the principle of the present disclosure shall fall within the scope of protection of the present disclosure.

The invention claimed is:

1. A collision energy absorption apparatus for a rail vehicle, comprising a connector (2), a base (3), and an energy absorption tearing tube (1) radially disposed on the outside of the connector (2), an inner wall and an outer wall of the energy absorption tearing tube (1) being provided with 2 to 20 pairs of kerfs (11), each pair of kerfs (11) comprising an inner kerf (111) and an outer kerf (112) which have radial positions corresponding to one another on the energy absorption tearing tube (1), each kerf being a non-closed linear kerf, and a width of the kerfs being between 0.05 and 0.8 mm, and the sum of depths of each pair of kerfs being less than a wall thickness of the energy absorption tearing tube (1); the base (3) comprises semicircle structures (31), such that torn strips of the energy absorption tearing tube (1) formed after a collision curl in a predetermined direction under the restriction of the structures.

2. The collision energy absorption apparatus according to claim 1, wherein a length direction of the kerfs coincides with a length direction of the energy absorption tearing tube (1), and the width of the kerfs is between 0.08 and 0.5 mm.

3. The collision energy absorption apparatus according to claim 2, wherein the width of the kerfs is between 0.1 and 0.3 mm, and the pairs of kerfs are uniformly distributed in a circumferential direction of the energy absorption tearing tube (1).

4. The collision energy absorption apparatus according to claim 1, wherein one end of each of the connector (2) and the energy absorption tearing tube (1) is fixedly connected to a collision fender (4) in a length direction, and the other end of each of the connector and the energy absorption tearing tube is connected to the base (3), the base (3) comprises an inner bore (32) in the base, and the connector (2) passes through the inner bore in the base.

5. The collision energy absorption apparatus according to claim 1, wherein a diameter of the energy absorption tearing tube (1) is between 50 and 400 mm, and a diameter of the semicircle structures (31) is between 30 and 350 mm, wherein the diameter of the semicircle structures (31) is 20 to 50 mm less than the diameter of the energy absorption tearing tube (1).

6. The collision energy absorption apparatus according to claim 1, wherein an end of the energy absorption tearing tube (1) close to the base (3) is provided with tearing openings (12), the tearing openings (12) extend through the wall thickness of the energy absorption tearing tube (1), the number of the tearing openings (12) is the same as the number of the pairs of the kerfs (11), and the tearing openings are in axially communication with the kerfs.

7. The collision energy absorption apparatus according to claim 6, wherein the tearing openings (12) and the kerfs (11) together form a structure crossing through both ends of the energy absorption tearing tube (1) in an axial direction of the energy absorption tearing tube.

8. The collision energy absorption apparatus according to claim 1, wherein the wall thickness of the energy absorption tearing tube (1) is between 6 and 20 mm.

9. The collision energy absorption apparatus according to claim 1, wherein a depth of each of the inner kerfs (111) and the outer kerfs (112) is between $1/10$ and $2/5$ of the wall thickness of the energy absorption tearing tube (1).

10. The collision energy absorption apparatus according to claim 2, wherein one end of each of the connector (2) and the energy absorption tearing tube (1) is fixedly connected to a collision fender (4) in a length direction, and the other end of each of the connector and the energy absorption tearing tube is connected to the base (3), the base (3) comprises an inner bore (32) in the base, and the connector (2) passes through the inner bore in the base.

11. The collision energy absorption apparatus according to claim 3, wherein one end of each of the connector (2) and the energy absorption tearing tube (1) is fixedly connected to a collision fender (4) in a length direction, and the other end of each of the connector and the energy absorption tearing tube is connected to the base (3), the base (3) comprises an inner bore (32) in the base, and the connector (2) passes through the inner bore in the base.

12. The collision energy absorption apparatus according to claim 2, wherein a diameter of the energy absorption tearing tube (1) is between 50 and 400 mm, and a diameter of the semicircle structures (31) is between 30 and 350 mm, wherein the diameter of the semicircle structures (31) is 20 to 50 mm less than the diameter of the energy absorption tearing tube (1).

13. The collision energy absorption apparatus according to claim 3, wherein a diameter of the energy absorption tearing tube (1) is between 50 and 400 mm, and a diameter of the semicircle structures (31) is between 30 and 350 mm, wherein the diameter of the semicircle structures (31) is 20 to 50 mm less than the diameter of the energy absorption tearing tube (1).

14. The collision energy absorption apparatus according to claim 2, wherein an end of the energy absorption tearing tube (1) close to the base (3) is provided with tearing openings (12), the tearing openings (12) extend through the wall thickness of the energy absorption tearing tube (1), the number of the tearing openings (12) is the same as the number of the pairs of the kerfs (11), and the tearing openings are in axially communication with the kerfs.

15. The collision energy absorption apparatus according to claim 3, wherein an end of the energy absorption tearing tube (1) close to the base (3) is provided with tearing openings (12), the tearing openings (12) extend through the wall thickness of the energy absorption tearing tube (1), the number of the tearing openings (12) is the same as the number of the pairs of the kerfs (11), and the tearing openings are in axially communication with the kerfs.

16. The collision energy absorption apparatus according to claim 2, wherein the wall thickness of the energy absorption tearing tube (1) is between 6 and 20 mm.

17. The collision energy absorption apparatus according to claim 3, wherein the wall thickness of the energy absorption tearing tube (1) is between 6 and 20 mm.

18. The collision energy absorption apparatus according to claim 2, wherein a depth of each of the inner kerfs (111) and the outer kerfs (112) is between 1/10 and 2/5 of the wall thickness of the energy absorption tearing tube (1).

19. The collision energy absorption apparatus according to claim 3, wherein a depth of each of the inner kerfs (111) and the outer kerfs (112) is between 1/10 and 2/5 of the wall thickness of the energy absorption tearing tube (1).

\* \* \* \* \*